United States Patent
Huang et al.

(10) Patent No.: US 11,942,626 B1
(45) Date of Patent: Mar. 26, 2024

(54) SCALABLE METHOD FOR PREPARING HIGH PERFORMANCE LITHIUM FERROMANGANESE PHOSPHATE COMPOSITE MATERIAL

(71) Applicants: Robert Brian Huang, Las Vegas, NV (US); Richard Brian Huang, Las Vegas, NV (US)

(72) Inventors: Robert Brian Huang, Las Vegas, NV (US); Richard Brian Huang, Las Vegas, NV (US)

(73) Assignee: Watix Technology LLC

( * ) Notice: Subject to any disclaimer, the term of this patent is extended or adjusted under 35 U.S.C. 154(b) by 0 days.

(21) Appl. No.: 17/982,540

(22) Filed: Nov. 8, 2022

(51) Int. Cl.
| | |
|---|---|
| H01B 1/06 | (2006.01) |
| H01M 4/36 | (2006.01) |
| H01M 4/58 | (2010.01) |
| H01M 4/587 | (2010.01) |
| H01M 4/62 | (2006.01) |
| H01M 4/02 | (2006.01) |

(52) U.S. Cl.
CPC ............ *H01M 4/364* (2013.01); *H01B 1/06* (2013.01); *H01M 4/5825* (2013.01); *H01M 4/587* (2013.01); *H01M 4/624* (2013.01); *H01M 2004/028* (2013.01)

(58) Field of Classification Search
CPC .......... H01B 1/00; H01B 1/06; C01G 45/006; C01G 49/009
See application file for complete search history.

(56) References Cited

U.S. PATENT DOCUMENTS

| | | | |
|---|---|---|---|
| 11,251,422 B2* | 2/2022 | Nozoe | H01M 4/587 |
| 2014/0322602 A1* | 10/2014 | Yamazaki | H01M 4/5825 |
| | | | 429/220 |
| 2019/0305363 A1* | 10/2019 | Nozoe | H01M 4/525 |

OTHER PUBLICATIONS

Tan et al "High Power Performance of Multicomponent Olivine Cathode Material for Lithium-Ion Batteries", Functional Materials Letters vol. 4, No. 3 (2011) 1-5.*
Zhao et al."Mn-doped LiFePO4/C Composite with Excellent High-Rate Performance as Lithium Ion Batteries Cathode", Int. J. Electrochem. Sci., 15 (2020) 8873-8882, doi: 10.20964/2020.09.18.*

(Continued)

*Primary Examiner* — Mark Kopec

(57) ABSTRACT

The invention discloses a method for synthesizing a lithium ferromanganese phosphate composite material. The method produces a lithium ferromanganese phosphate composite material and resolves prior art issues of low molecular surface area and easy water absorption of the product. Furthermore, it minimizes prior method's difficult or expensive steps and lack of flexible control of the iron to manganese ratio within the lithium ferromanganese phosphate compound. In this method, many milling and sintering steps are taken to increase the compound's molecular surface area. Furthermore, selected carbon additives resolve the low conductivity brought about by low molecular surface area. As well, a hydrophobic material is coated on the surface of lithium ferromanganese phosphate to insulate it from outside moisture. Finally, relatively cheap iron sulfate and manganese sulfates are used with oxalate compounds to minimize costs while maximizing control of iron to manganese ratios within the lithium ferromanganese phosphate compound.

20 Claims, 3 Drawing Sheets

(56) References Cited

OTHER PUBLICATIONS

Liu et al."High Energy Density LiFePO4/C Cathode Material Synthesized by Wet Ball Milling Combined with Spray Drying Method", Journal of The Electrochemical Society, 164 (14) A3666-A3672 (2017).*

* cited by examiner

SCALABLE METHOD FOR PREPARING HIGH PERFORMANCE LITHIUM FERROMANGANESE PHOSPHATE COMPOSITE MATERIAL

TECHNICAL FIELD

The present invention concerns the field of chemical technology, in particular to the materials of lithium-ion batteries, in particular to a method of preparing a cathode composite material of lithium ferromanganese phosphate.

BACKGROUND

Lithium-ion batteries are a relatively new technology for the storage of energy, providing high capacity, high voltage, high power, long life cycle, high performance, thermally stable batteries that have found common use in mobile phones, notebook computers, digital cameras, camcorders, and other electronic instruments. The technology has also been used in UPS, electric tools, electric bicycles, electric vehicles, grid energy storage, and other emerging energy-demanding fields. In recent years, the production, technology, and performance of lithium ion batteries has grown exponentially, and it has become even more widely used. At present, lithium ion batteries have become increasingly mature in the fields of both small batteries for portable electronic products, and medium to large batteries for large capacity, high power and large energy storage needs.

The choice of cathode material is important in the construction of lithium ion batteries, as the performance of the batteries largely depend on the chemical properties of the chosen cathode. Consequently, cathode material research is integral to lithium ion battery development. There are currently many kinds of cathode materials for lithium-ion batteries, the most common of which include lithium cobalt oxide, lithium manganese oxide, lithium nickel-cobalt-manganese, and lithium iron phosphate. Lithium cobalt oxide is the most mature of the existing cathode electrode materials and it is mainly used in the field of small batteries, such as mobile phones and digital products. However, disadvantages of the battery include its low cost efficiency (as a result of the high price of cobalt and nickel as raw materials), large environmental impact (as a result of the heavy pollution during mining of the raw materials and during the battery's production), and low safety (as a result of its low thermal stability). Relatively speaking, lithium-ion batteries with lithium manganese oxide, lithium nickel-cobalt-manganese and lithium iron phosphate as cathode materials have better safety performance and better cost efficiency. As such, current industries are mainly focused on these materials. Among them, lithium iron phosphate distincts itself by having an extremely long cycle life and the best dollar to kiloWatt hour of storage.

An emerging new cathode material, lithium ferromanganese phosphate, when compared with lithium iron phosphate, can provide better overall performance. The theoretical capacity of lithium ferromanganese phosphate is comparable to that of lithium iron phosphate (~160-180 mAh/g). However, its $Li^+/Li$ electrode potential is much higher (4.1V vs. 3.2V), which allows the battery to have higher energy density when compared to that of lithium iron phosphate. For instance, if the actual capacity of the battery with a lithium ferromanganese phosphate cathode is the same as one with the lithium iron phosphate cathode, its energy density will be 30% higher. Furthermore, when compared to lithium-manganese oxide, which has the same voltage as lithium ferromanganese phosphate, the latter's energy density will be 20% higher due to its higher capacity. Its electrochemical structure also grants the lithium ferromanganese phosphate better thermal and electrochemical stability when compared to other cathode types, in particular to lithium nickel-cobalt-manganese and lithium-manganese oxide. Overall, lithium ferromanganese phosphate provides a safe, high-capacity, long-term energy storage solution.

Current developments in lithium ferromanganese phosphate and lithium iron phosphate have had difficulties with a too low specific surface area (thereby decreasing conductivity), a tendency to absorb water (thereby decreasing conductivity and decreasing cycle life), and an overall too complex or expensive method of making the battery (which restricts large-scale applications in the field of power and energy storage). Furthermore, current methods of production cannot control the iron to manganese ratio to a high degree of flexibility, thereby discouraging the production of lithium ferromanganese phosphate batteries to solve or fulfill specific problems or requests.

SUMMARY

The purpose of the present disclosure is to provide a preparation method of lithium ferromanganese phosphate cathode material to solve the problems in the prior art, such as low molecular surface area, easy water absorption, difficult or expensive steps in their methods, and a lack of flexible control of the iron to manganese ratio within the lithium ferromanganese phosphate compound.

The technical details of the disclosure are described as follows.

A method for preparing a lithium ferromanganese phosphate composite material, comprising:
- (S1) Weighing iron sulfate and manganese sulfate according to the stoichiometric ratio of each element in $LiMn_xFe_{1-x}PO_4$, whereby $0.1 \leq X \leq 0.9$ and mixing them in water to create solution 1 (Sol-1). An oxalate compound is mixed into Sol-1 and a base is added to control the pH to precipitate ferromanganese oxalate, which is subsequently filtered, washed with water, and dried.
- (S2) Mixing and subsequently ball-milling a lithium source, a phosphorus source, a carbon source, and the ferromanganese oxalate in a solvent medium. The mixture is subsequently spray dried, calcined in an inert atmosphere, and cooled to obtain a precursor lithium ferromanganese phosphate material.
- (S3) Mixing and subsequently ball-milling the product of step S2 in a solvent medium with a dissolved hydrophobic material, followed with spray drying and calcining for a second time to obtain the lithium ferromanganese phosphate material composite material. The described lithium ferromanganese phosphate composite material comprises the lithium ferromanganese phosphate material and the carbon and hydrophobic material coating.

Preferably, in step S1, when creating Sol-1, the right amount of water makes the liquid mass percentage content in the system 30-90%.

Preferably, in step S1, the oxalate compound is added under rapid stirring at 40-70° C.

Preferably, in step S1, when controlling the pH, the base used is sodium hydroxide or ammonia to control the pH to 3-4.

Preferably, the oxalate compound is one of or a combination of oxalic acid and ammonium oxalate; the lithium source is one of or a combination of lithium carbonate, lithium hydroxide, and lithium acetate; the phosphorus source is one of or a combination of phosphoric acid, ammonium dihydrogen phosphate, diammonium hydrogen phosphate, and ammonium phosphate; the carbon source is one of or a combination of glucose, PEG (polyethylene glycol), PVA (polyvinyl alcohol), or sucrose.

Preferably, the molar ratio of the oxalate compound to the molar combination of iron sulfate and manganese sulfate is $H_2C_2O_4:FeSO_4+MnSO_4=1–1.1$.

Preferably, in step S1, ferromanganese oxalate is dried at 110° C.-200° C. in an air atmosphere.

In an embodiment, in step S1, after filtering the ferromanganese oxalate solution, the solute is fed into an Mechanical Vapor Recompression system to recycle the sodium sulfate, ammonia, and water produced and used in step S1.

Preferably, the lithium source and phosphorus source in the lithium ferromanganese phosphate composite material is weighed according to the stoichiometric ratio of each element in $LiMn_xFe_{1-x}PO_4$, whereby $0.1 \leq X \leq 0.9$.

In an embodiment, in step S2, the lithium source and phosphorus source are mixed within the solvent medium prior to the addition of the carbon source, the ferromanganese oxalate, or any other additives in order to emit gaseous impurities (such as carbon dioxide) from the solution.

Preferably, in step S2, the mass of the carbon source is 0.5% to 5% of the solid mass of the mixture.

In an embodiment, in step S2, a doping agent is added to increase the conductivity of the lithium ferromanganese phosphate. Preferably, the doping agent is titanium dioxide ($TiO_2$). Preferably, the doping agent is an amount of 0.1-0.5 mass % of the theoretical lithium ferromanganese phosphate within the solution.

Preferably, in step S2 and S3 the solvent medium of the primary and secondary ball milling is water, ethanol, or acetone, and the milling time is 2h~12h. The right amount of solvent medium makes the liquid mass percentage content in the system 30-80%.

Preferably, in step S2 and S3, the ball-milling is performed with a ball mill and with balls smaller than 5 mm.

In an embodiment, in step S2 and S3, the ball-milling can be replaced by two or more sequential milling steps, whereby a milling machine or tool is used to evenly or unevenly apply force to the material such that the material becomes smaller.

Preferably, the temperature and duration of the first calcination is 400~700° C. for 6h~12h and of the second calcination is 300~800° C. for 3h~16h.

Preferably, the atmospheres for the first and second calcinations are argon or nitrogen.

Preferably, in step S3, the hydrophobic material is a polyurethane.

Preferably, the mass of the added hydrophobic material is 0.5% to 5% of the mass of the lithium ferromanganese phosphate material.

Preferably, in step S2 and S3, the spray drying temperature is 80° C.~300° C.

Preferably, the cooling method of step S2 is natural cooling at room temperature until the material reaches room temperature.

The lithium ferromanganese phosphate composite material prepared comprises lithium ferromanganese phosphate material, additive carbon, and the hydrophobic material coating on the surface of the lithium ferromanganese phosphate. Since the hydrophobic material is coated on the surface of lithium ferromanganese phosphate, the lithium ferromanganese phosphate is insulated from outside moisture. Therefore, compared to traditional lithium ferromanganese phosphate material, this lithium ferromanganese phosphate composite material does not easily absorb water within a lithium ferromanganese phosphate battery.

In addition, the whole preparation process of this lithium ferromanganese phosphate composite material is far more simple to operate and scale to industrial production. The process produces a high molecular surface area cathode material by sintering, milling, and sieving multiple times to ensure granularity. The process also decreases overall costs by using relatively cheap iron sulfate and manganese sulfate. Furthermore, their usage allows control of the iron to manganese ratio in the lithium ferromanganese phosphate material by freely adjusting the moles of the mixed iron sulfate and manganese sulfate.

BRIEF DESCRIPTION OF THE DRAWINGS

FIG. 1a, FIG. 1b, and FIG. 1c are graphs illustrating the charge and discharge curves at various rates of a half-cell coin battery that uses a lithium ferromanganese phosphate cathode prepared according to embodiment 1 of the present invention.

FIG. 1d is a table displaying various electrochemical properties of a half-cell coin battery that uses a lithium ferromanganese phosphate cathode prepared according to embodiment 1 of the present invention. The first column describes the first cycle efficiency of the half-cell. The second column indicates the capacity of the battery after the first charge. The remaining columns indicate the discharge capacity of the battery at various charge rates.

DETAILED DESCRIPTION OF EMBODIMENTS

In order to promote the understanding of the present disclosure, the disclosure will be described below in detail, with reference to the preferred embodiments. It should be understood that the embodiments are merely illustrative, and are not intended to limit the scope of the present disclosure. Any changes, modifications and replacements made by those skilled in the art without departing from the spirit of the disclosure should fall within the scope of the disclosure defined by the appended claims.

The instruments used in the following embodiments include: a sanding machine (model SX-200, manufactured by Wuxi Xiguang Powder Technology Co., LTD); a spray dryer (model LP-12, manufactured by Shanghai Gaoling Technology Development Co., LTD); a tube box furnace (model OTL1200-11, manufactured by Anhui Hefei Hengli Electronic Equipment Company); and an air box furnace (model HXL004-12, manufactured by Anhui Hefei Hengli Electronic Equipment Company).

Embodiment 1

The present disclosure provides a method for preparing a lithium ferromanganese phosphate composite material, which is described as follows:

(S1) Weigh 91.14 g iron sulfate and 60.40 g manganese sulfate into 151 ml distilled water. After stirring, add 90.03 g of oxalic acid at 60° C. to precipitate ferromanganese oxalate. Add sodium hydroxide to control the pH to 3.5. Filter the ferromanganese oxalate, wash the material with distilled water, and dry it at 120° C. in an air atmosphere.

(S2) Mix 23.95 g of lithium hydroxide, 149.09 g of ammonium phosphate, 7.91 g of polyvinyl alcohol, 0.652 g of titanium dioxide and the ferromanganese oxalate product of S1 in 413 mL of deionized water in a high-speed ball milling machine for 3 hours with 3 mm balls. Dry the obtained slurry in a spray drying machine at an inlet temperature of 110° C. and an outlet temperature of 230° C. Calcinate the material at 670° C. for 8 hours in a nitrogen atmosphere and subsequently cool it at room temperature to obtain the lithium ferromanganese phosphate $LiMn_{0.4}Fe_{0.6}PO_4$ material.

(S3) Mix the lithium ferromanganese phosphate product of S2 and 3.93 g polyurethane in 206 mL of acetone in a high-speed ball milling machine for 3 hours with 1 mm beads. Dry the material in an air drying oven at 120° C. Calcinate the material at 400° C. for 14 hours in a nitrogen atmosphere to obtain the lithium ferromanganese phosphate $LiMn_{0.4}Fe_{0.6}PO_4$ composite material.

Figure 1:
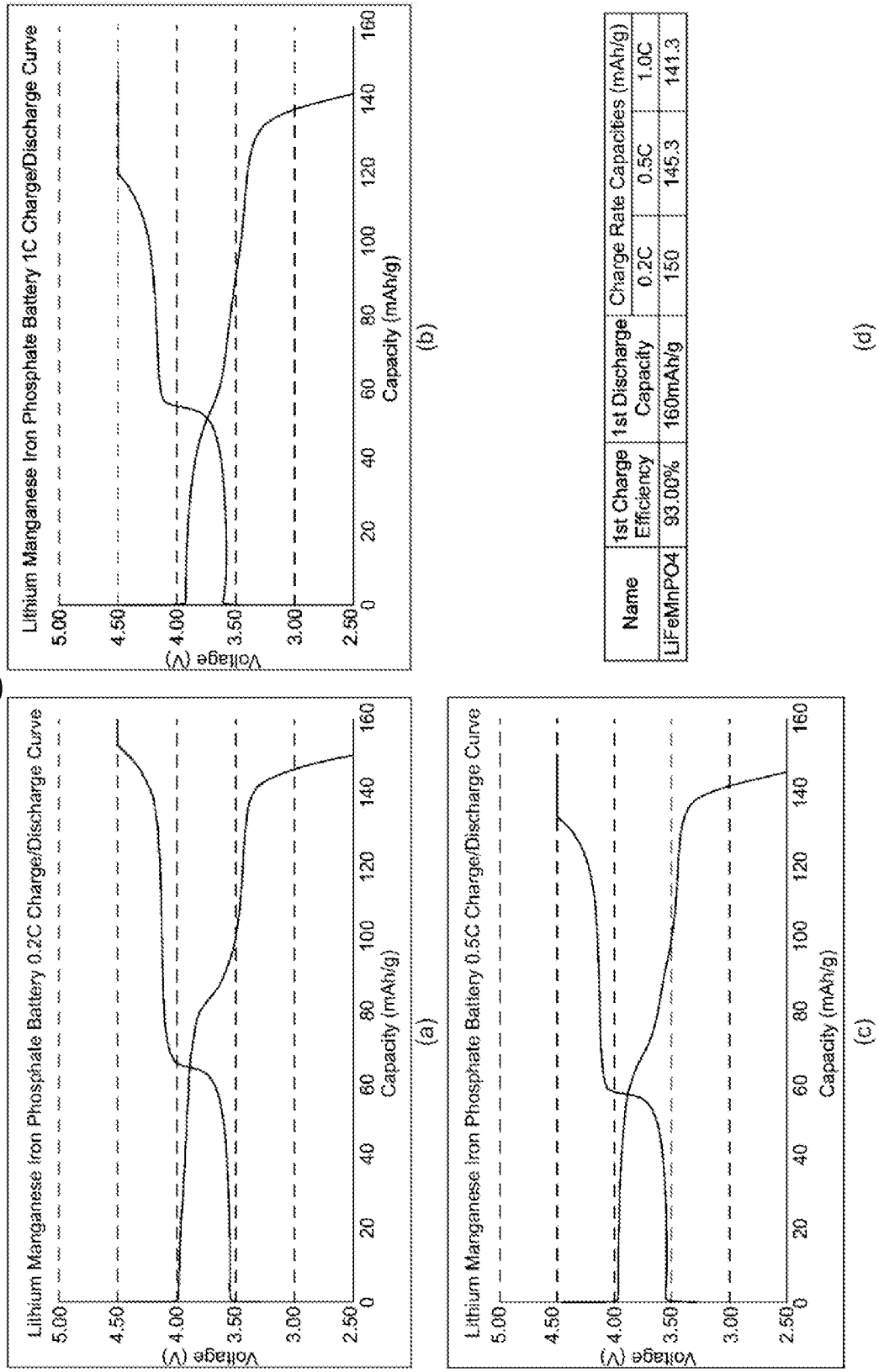
FIG. 1 features 3 charts and 1 table that illustrate the charge and discharge characteristics of a half-cell coin battery that uses a lithium ferromanganese phosphate cathode prepared according to embodiment 1 of the present invention.
Figure 2:
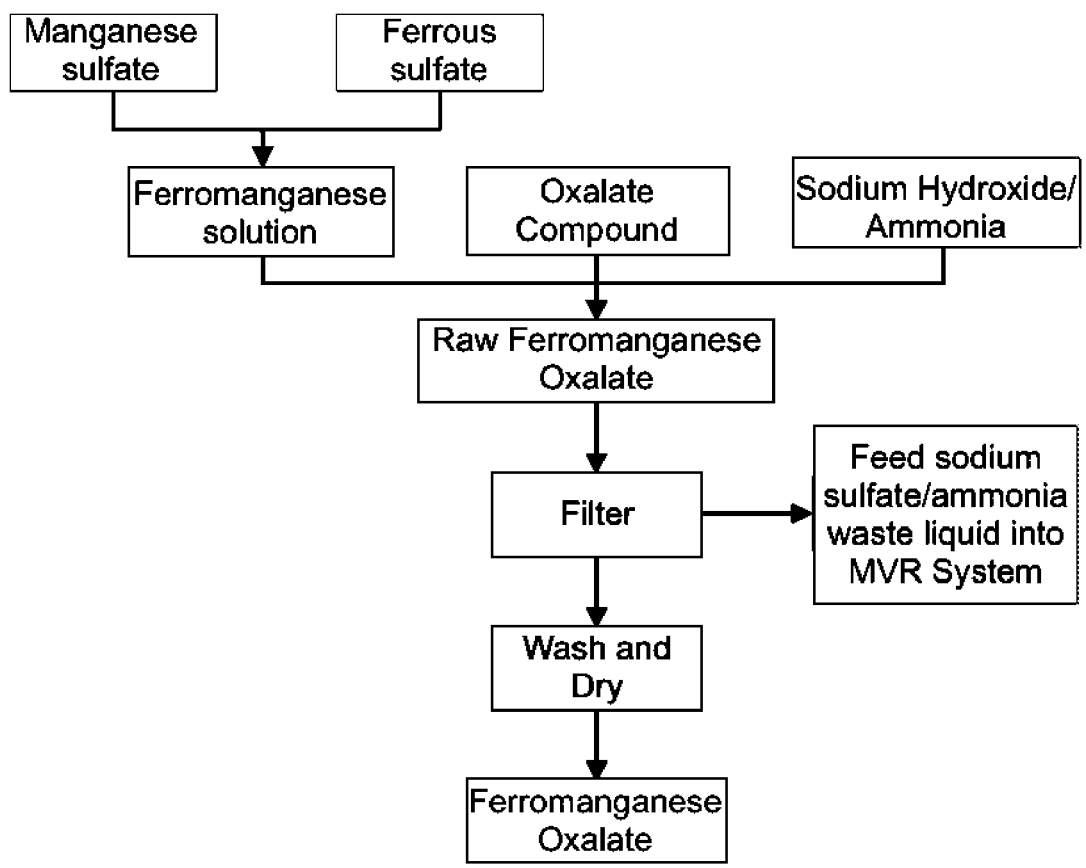
FIG. 2 is a flow chart of step S1, which is described in the summary portion of this disclosure. Specifically, it is a flow chart describing the preparation method of the ferromanganese oxalate in an embodiment.
Figure 3:
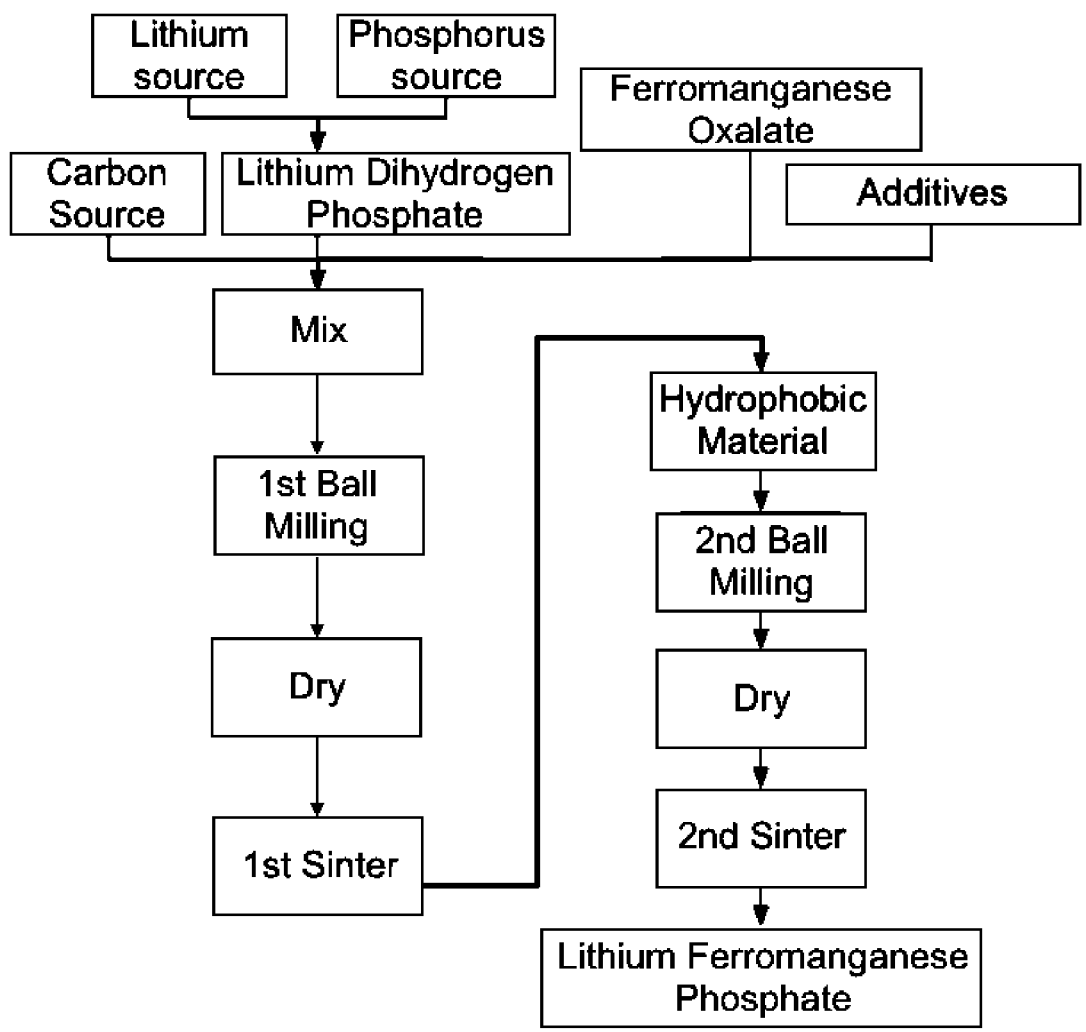
FIG. 3 is a flow chart of step S2 and step S3, which are described in the summary portion of this disclosure. Specifically, it is a flow chart describing the preparation method of the lithium ferromanganese phosphate in an embodiment.

The discharge specific capacities of a half cell coin battery prepared using the lithium ferromanganese phosphate composite material cathode prepared by this example, according to FIG. 1, are 150 mAh/g and 141.3 mAh/g at 0.2C and 1C respectively. Furthermore, the first cycle efficiency is 93% at 0.2C. The lithium ferromanganese phosphate composite material cathode prepared therefore has high specific capacity, good conductivity, and excellent rate-ability performance.

Embodiment 2

(S1) Weigh 72.4 g iron sulfate and 66.2 g manganese sulfate into 141 ml deionized water. After stirring, add 93.0 g of oxalic acid at 60° C. to precipitate ferromanganese oxalate. Add ammonium to control the pH to 3.7. Filter the ferromanganese oxalate, wash the material with distilled water, and dry it at 140° C. in an air atmosphere.

(S2) Mix 24.3 g of lithium carbonate and 76.2 g of phosphoric acid in 356 mL of deionized water for 5 min. Then add 8.5 g of polyvinyl alcohol, 10.2 g of glucose, 1.02 g of titanium dioxide and the ferromanganese oxalate product of S1. Feed the solution into a high-speed bead milling machine for 3 hours with 3 mm beads. Then feed the solution into a sand milling machine for 3 hours with 0.5 mm beads. Dry the obtained slurry in a spray drying machine at an inlet temperature of 110° C. and an outlet temperature of 230° C. Calcinate the material at 670° C. for 8 hours in a nitrogen atmosphere and subsequently cool it at room temperature to obtain the lithium ferromanganese phosphate $LiMn_{0.6}Fe_{0.4}PO_4$ material.

(S3) Mix the lithium ferromanganese phosphate product of S2 and 4.43 g polyurethane in 216 mL of acetone in a high-speed ball milling machine for 3 hours with 0.5 mm beads. Dry the material in an air drying oven at 150° C. Calcinate the material at 400° C. for 14 hours in a nitrogen atmosphere to obtain the lithium ferromanganese phosphate $LiMn_{0.6}Fe_{0.4}PO_4$ composite material.

Embodiment Moisture Comparison Test:

The lithium ferromanganese phosphate material without hydrophobic material coating (sample A) was obtained immediately following step S2 in embodiment 1. The lithium ferromanganese phosphate composite material (sample B) was obtained immediately following step S3 in embodiment 1. Sample A and sample B were independently dried at 600° C. for 8 hours in a nitrogen atmosphere. After cooling them to room temperature, a coulometer was used to measure the moisture of the two samples. The initial moisture levels of sample A and sample B were 86 ppm and 78 ppm respectively. Sample A and sample B were then left at room temperature for 72 hours, after which their moistures were measured again. The final moisture levels of sample A and sample B were 1424 ppm and 144 ppm respectively, indicating that the hydrophobic coating within the lithium ferromanganese phosphate composite material prevented water absorption.

The invention claimed is:

1. A method for preparing a lithium ferromanganese phosphate composite material comprising the following sequential steps:
   (S1) weighing iron sulfate and manganese sulfate according to the stoichiometric ratio of each element in $LiMn_xFe_{1-x}PO_4$, whereby $0.1 \leq X \leq 0.9$, and mixing the iron sulfate and manganese sulfate in water, followed by adding an oxalate compound and a base to precipitate ferromanganese oxalate wherein; the solution is subsequently filtered and the solid is washed with water and then dried;
   (S2) mixing and subsequently ball-milling a lithium source, a phosphorus source, a carbon source, and the ferromanganese oxalate (from step S1) in a solvent medium, the resulting solution of which is subsequently spray dried or plough dried; wherein the remaining solid is calcined in an inert atmosphere and cooled to obtain a precursor lithium ferromanganese phosphate material;
   (S3) mixing and subsequently ball-milling the product of step S2 in a solvent medium with a dissolved hydrophobic material, followed by spray drying or plough drying, whereby the solid product is subsequently calcined to obtain the lithium ferromanganese phosphate composite material; the described lithium ferromanganese phosphate composite material of which comprises the lithium ferromanganese phosphate material and the carbon and hydrophobic material coating.

2. The method for preparing lithium ferromanganese phosphate composite material of claim 1, wherein, in step S1, the mass of water that the iron sulfate and manganese sulfate are added into makes the liquid mass percentage content in the system 30%-90%.

3. The method for preparing lithium ferromanganese phosphate composite material of claim 1, wherein, in step S1, the oxalate compound is added under rapid stirring at 40° C.-70° C.

4. The method for preparing lithium ferromanganese phosphate composite material of claim 1, wherein, in step S1, when controlling the pH, the base used is sodium hydroxide, ammonia, or a combination of both to control the pH to 3-4.

5. The method for preparing lithium ferromanganese phosphate composite material of claim 1, wherein the oxalate compound is selected from the group consisting of oxalic acid, ammonium oxalate, and mixtures thereof; the lithium source is selected from the group consisting of lithium carbonate, lithium hydroxide, lithium acetate, and mixtures thereof; the phosphorus source is selected from the group consisting of phosphoric acid, ammonium dihydrogen phosphate, diammonium hydrogen phosphate, ammonium phosphate, and mixtures thereof; and the carbon source is selected from the group consisting of glucose, polyethylene glycol, polyvinyl alcohol, sucrose, and mixtures thereof.

6. The method for preparing lithium ferromanganese phosphate composite material of claim 1, wherein the molar ratio of the oxalate compound added to the molar combination of iron sulfate and manganese sulfate is $H_2C_2O_4$:$(FeSO_4+MnSO_4)$=1-1.1.

7. The method for preparing lithium ferromanganese phosphate composite material of claim 1, wherein, in step S1, the ferromanganese oxalate is dried at 110° C.-200° C. in an air atmosphere.

8. The method for preparing lithium ferromanganese phosphate composite material of claim 1, wherein, in step S1, after filtering the ferromanganese oxalate solution, the solute is fed into an Mechanical Vapor Recompression system to recycle the sodium sulfate, ammonia, and water produced and used in step S1.

9. The method for preparing lithium ferromanganese phosphate composite material of claim 1, wherein, in step S2, the lithium source and phosphorus source in the lithium ferromanganese phosphate composite material is weighed according to the stoichiometric ratio of each element in $LiMn_xFe_{1-x}PO_4$, whereby $0.1 \leq X \leq 0.9$.

10. The method for preparing lithium ferromanganese phosphate composite material of claim 1, wherein, in step S2, the lithium source and phosphorus source are mixed within the solvent medium prior to the addition of the carbon source, the ferromanganese oxalate, or any other additives.

11. The method for preparing lithium ferromanganese phosphate composite material of claim 1, wherein, in step S2, the mass of the carbon source is 0.5% to 5% of the solid mass of the mixture.

12. The method for preparing lithium ferromanganese phosphate composite material of claim 1, wherein, in step S2, a doping agent is added to increase the conductivity of the lithium ferromanganese phosphate.

13. The method for preparing lithium ferromanganese phosphate composite material of claim 12, wherein the doping agent is titanium dioxide ($TiO_2$) that is an amount of 0.1-0.5 mass % of the theoretical lithium ferromanganese phosphate within the solution.

14. The method for preparing lithium ferromanganese phosphate composite material of claim 1, wherein in step S2 and S3, the solvent medium of the primary and secondary ball milling is water, acetone, or ethanol, and the milling time is 2h-12h; the mass of the solvent medium used in both steps makes the liquid mass percentage content in their respective systems 30%-80%.

15. The method for preparing lithium ferromanganese phosphate composite material of claim 1, wherein in step S2 and S3, the ball-milling is one or more sequential milling or grinding steps, whereby the purpose of each step is to use a ball milling machine or tool to evenly or unevenly apply force to the material such that the material's particle size is reduced.

16. The method for preparing lithium ferromanganese phosphate composite material of claim 1, wherein the temperature and duration of the first calcination is 400° C.-700° C. for 6h-12h and the temperature and duration of the second calcination is 300° C.-800° C. for 3h-16h.

17. The method for preparing lithium ferromanganese phosphate composite material of claim 1, wherein the atmospheres for the first and second calcinations are argon or nitrogen.

18. The method for preparing lithium ferromanganese phosphate composite material of claim 1, wherein, in step S3, the hydrophobic material is a polyurethane.

19. The method for preparing lithium ferromanganese phosphate composite material of claim 1, wherein, in step S3, the mass of the described hydrophobic material is 0.5% to 5% of the mass of the theoretical lithium ferromanganese phosphate material.

20. The method for preparing lithium ferromanganese phosphate composite material of claim 1, wherein, in step S2 and S3, the spray drying or plough drying temperature is 80° C.-300° C.

* * * * *